Jan. 11, 1966  V. GRASSANO  3,228,377
AUTOMATIC WATERING SYSTEM FOR ANIMALS
Filed Aug. 14, 1963  3 Sheets-Sheet 3
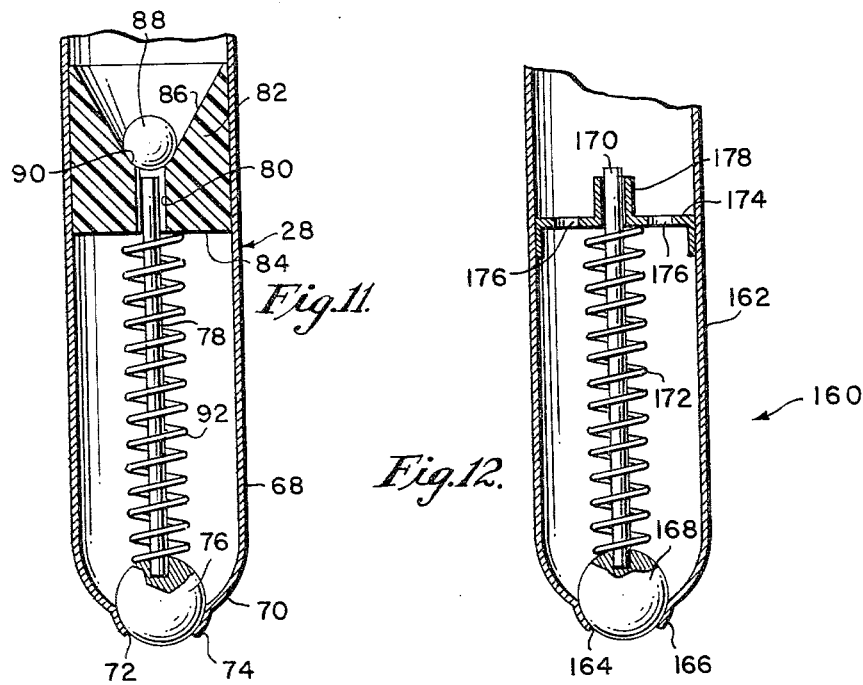
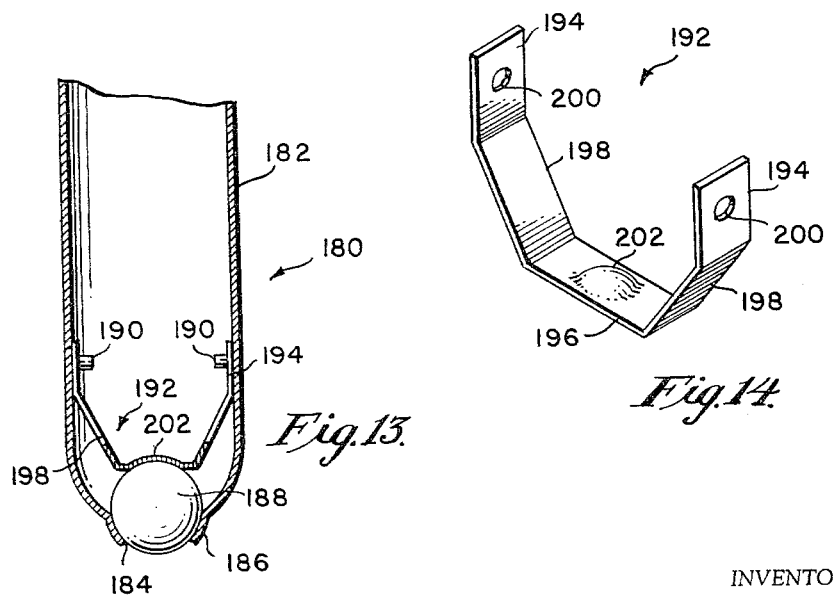
INVENTOR.
VINCENT GRASSANO
BY
Caesar and Rivise
ATTORNEYS.

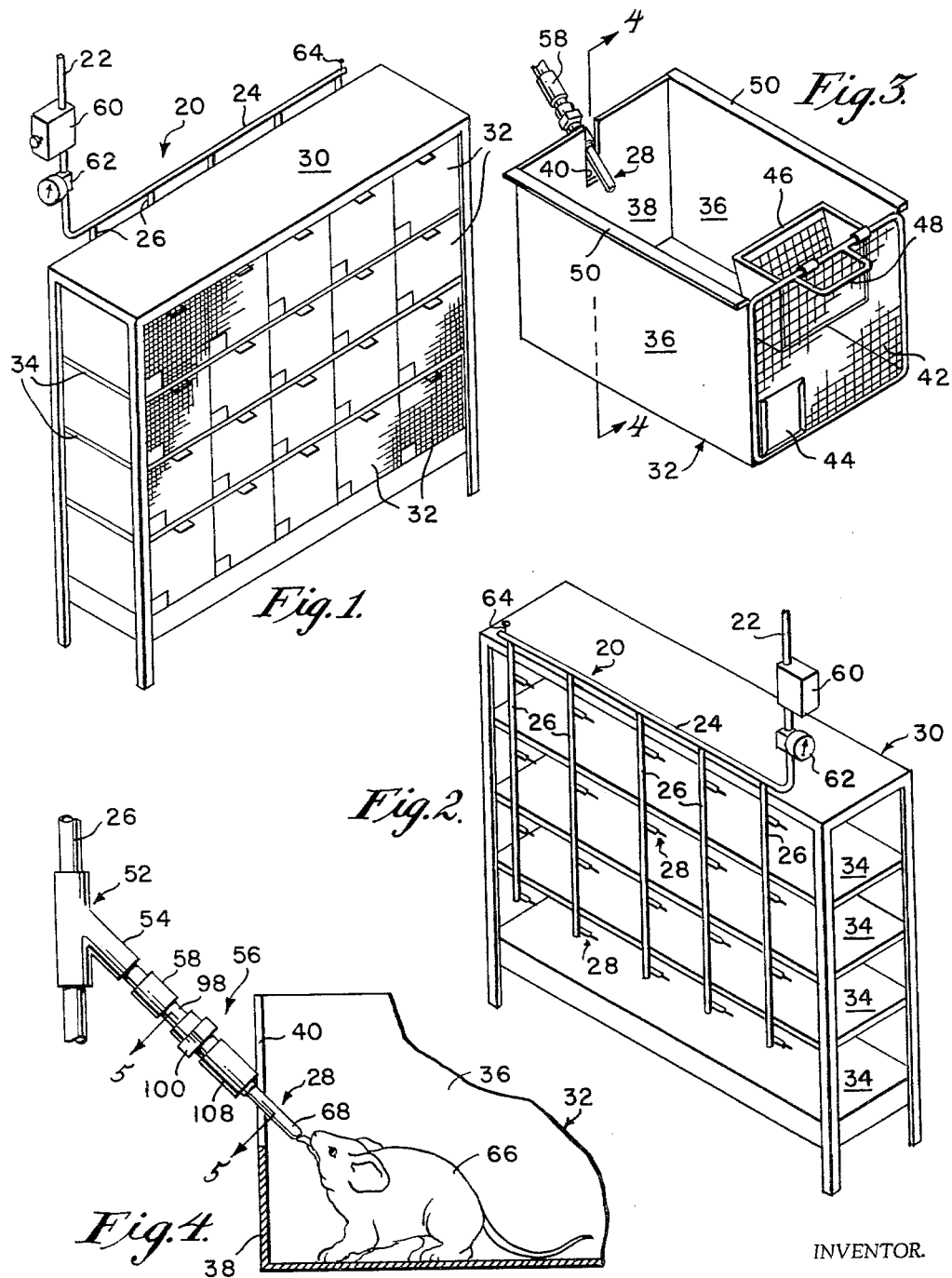

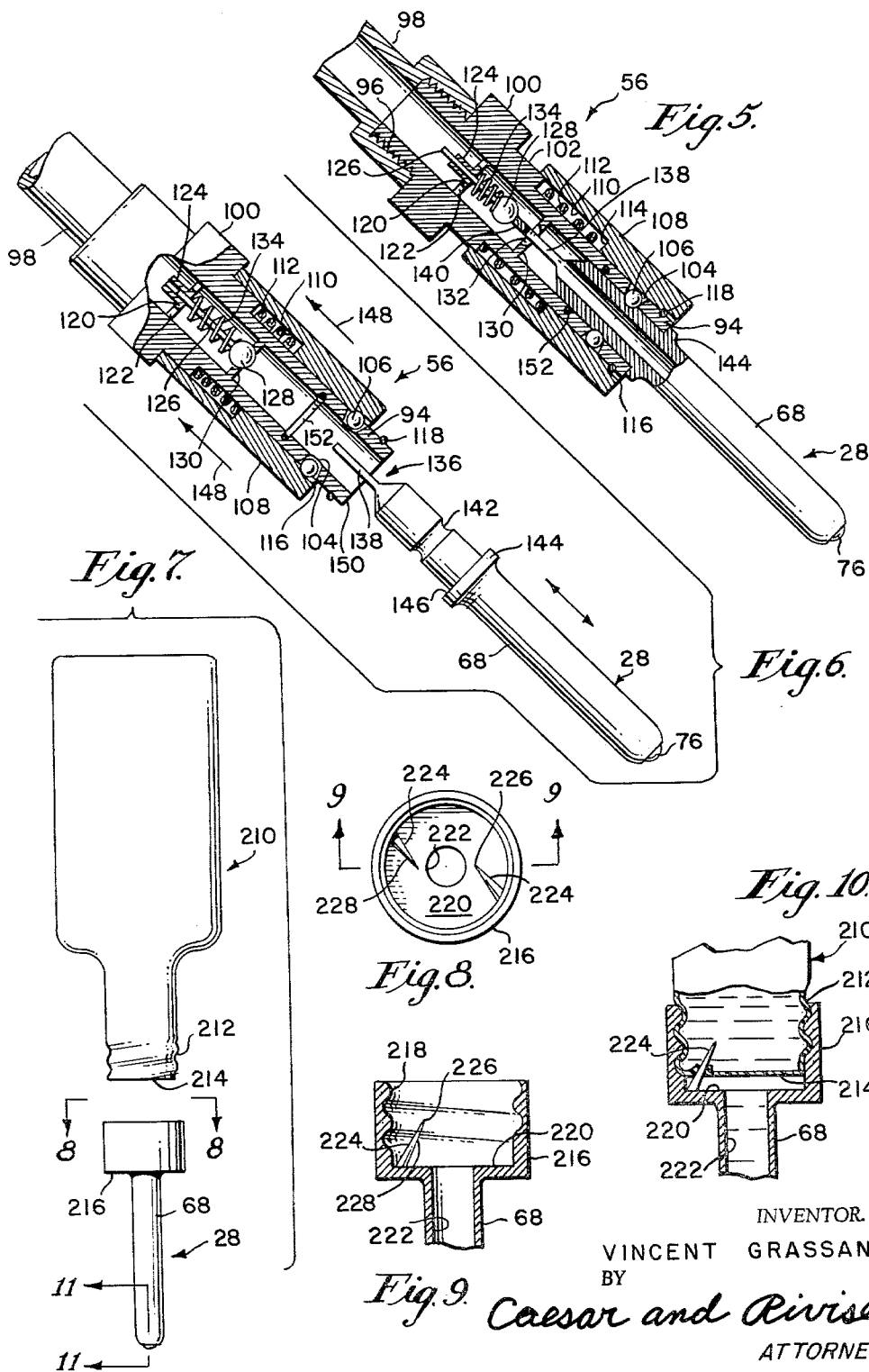

United States Patent Office 3,228,377
Patented Jan. 11, 1966

3,228,377
AUTOMATIC WATERING SYSTEM FOR ANIMALS
Vincent Grassano, 41 Ridge Road, Media, Pa.
Filed Aug. 14, 1963, Ser. No. 302,036
15 Claims. (Cl. 119—72.5)

This invention relates to an automatic watering device for use with animals, particularly laboratory animals.

It is now common practice to provide water for experimental animals by means of a water bottle having a tube at the top thereof. This tube has a restricted opening at its top. In use the water bottle is inverted and the tube projects into the cage of the animal. Because of the narrowness of the tube and its restricted opening at one end, the surface tension of the water will prevent the emptying of the water bottle. When the animal desires to obtain a drink, it will lap the restricted opening with its tongue, which in turn causes a bubble of air to rise up the tube and a drop of water to be emitted from the tube.

One of the problems with the above described device, which is now the most common device for the purpose, is that any amount of vibration of the cage might cause the water in the bottle to be completely dispensed through the water tube, thereby drowning the animal.

Another shortcoming of this device is that when the bottles are emptied both the bottle and water tube must be sterilized before being refilled with water or other liquid. In large experimental laboratories as many as 10,000 bottles and tubes must be cleaned each day.

Various other watering devices have been attempted in an effort to replace the tube. These devices included various means for sealing the open end of the watering tube thereby preventing drowning of the animal caused by vibration. However, these devices also had the disadvantage that dirt could become lodged in the sealing means thereby holding it in an open position, which would also result in the drowning of the animal.

The device of this invention completely overcomes all of the aforementioned disadvantages of the prior art watering devices. This device is completely automatic in operation and cannot result in the accidental drowning of the animal.

Another feature of this invention resides in the fact that from using the automatic watering device a complete watering system for a bank of cages or a group of animals can be maintained under pressure. Until this invention, it was believed that water for animals could only be obtained from individual bottles. However, the automatic watering device of this invention will function effectively regardless of the pressure of the water being supplied to the device. Thus, it is possible to tap water for each cage in a bank of cages from a central water tube, without the necessity of providing individual bottles for each of the cages.

It is, therefore, an object of this invention to provide a novel automatic watering tube for animals.

It is another object of this invention to provide an automatic watering tube in which all of the parts can be autoclaved.

It is a further object of this invention to provide a watering tube that automatically closes when the animal stops drinking.

It is a further object of this invention to provide a watering tube which will operate effectively regardless of the pressure of the water being supplied to the tube.

It is a further object of this invention to provide an automatic watering tube which can be used in connection with sealed disposable containers of sterile water or other liquid.

It is a further object of this invention to provide an automatic watering system for animals.

These and other objects of this invention are accomplished by providing an automatic watering device comprising a tube, said tube having a restricted opening at one end thereof, said restricted opening including a socket, means within said tube for conforming to and sealing said socket, and resilient means for holding said sealing means within said socket.

Other objects and many of the attendant advantages of this invention will be readily appreciated as the same becomes better understood by reference to the following detailed description when considered in connection with the accompanying drawings wherein:

FIG. 1 is a perspective view of a bank of cages containing experimental animals, taken from the front thereof, and showing the top of the automatic watering system of this invention;

FIG. 2 is a perspective view of the rack holding the bank of cages, taken from the rear thereof, and showing the automatic watering system of this invention;

FIG. 3 is a perspective view of one animal cage showing the automatic watering device of this invention projecting therein;

FIG. 4 is an enlarged sectional view taken along the line 4—4, and additionally showing an experimental rodent obtaining water from the automatic watering device of this invention;

FIG. 5 is an enlarged sectional view taken along the line 5—5 of FIG. 4;

FIG. 6 is an exploded sectional view of the device of FIG. 5, showing the method used to disconnect the automatic watering tube from the system;

FIG. 7 is an exploded elevational view of a disposable bottle and one modification of the automatic watering device of this invention;

FIG. 8 is a plan view of the automatic watering device of FIG. 7 looking in the direction of line 8—8 of FIG. 7;

FIG. 9 is a sectional view taken along the line 9—9 of FIG. 8;

FIG. 10 is a fragmentary sectional view of the bottle of FIG. 7 engaged by the dispensing tube of FIG. 7;

FIG. 11 is an enlarged sectional view taken along the line 11—11 of FIG. 7 and showing one embodiment of the automatic watering device of this invention;

FIG. 12 is a sectional view similar to FIG. 11 but showing a second embodiment of the automatic watering device of this invention;

FIG. 13 is a sectional view similar to FIGS. 11 and 12 but showing a third embodiment of the automatic watering device of this invention; and FIG. 14 is a perspective view of the leaf spring used in the embodiment of FIG. 13.

Referring now in greater detail to the various figures of the drawings wherein similar reference characters refer to similar parts, an automatic water system embodying the present invention is generally shown at 20 in FIGS. 1 and 2. Device 20 basically comprises an inlet pipe 22, a main supply pipe 24, and parallel branch pipes 26 emanating from main pipe 24. Emanating from branch pipes 26 are a plurality of automatic watering tubes or devices which are generally shown at 28.

Automatic watering system 20 can be mounted on a cage rack 30 containing a plurality of experimental animal cages 32. As seen in FIG. 2 rack 30 includes a plurality of horizontal shelves 34 on which cages 32 are slidable.

A typical animal cage which may be used in this invention is shown in detail in FIG. 3. Thus, it is seen that cage 32 includes a pair of impervious vertical side walls 36 and an impervious vertical rear wall 38. A vertical slot 40 is cut in the rear wall 38. This slot is slightly wider than the width of watering tube 28. The front of the cage is provided wtih a vertical mesh wall 42. The purpose of the mesh is to allow for the viewing of the animal. Mounted on wall 42 is a cardholder 44 used for identification purposes, as is well known in the art. Mounted within cage 32 and on wall 42 is a mesh hopper 46 used to hold solid granular food for the animal. A handle 48 is used for removing the cage from the rack.

The cage described above is exemplary of the many types of animal cages that can be used with this invention. The one difference between the cages used with this invention and those of the prior art is the provision of slot 40 for the reception of watering tube 28. It should be noted that there is no lid or cover for cage 32 which is shown in FIG. 3. The reason for this is that the bottom of the next higher shelf in rack 30 serves as a cover for the cage thereby preventing the escape of the animal confined within. When the cage is removed from the rack a temporary cover can be placed over the top, and it will rest on flanges 50 extending horizontally outward from vertical slots 36.

The connection of watering tubes 28 to branch tubes 26 is shown in FIG. 4. Thus, it is seen that a plurality of couplings 56 having branch lines 54 are periodically spaced along pipes 26. It should be noted that branch lines 54 extend angularly downward from pipes 26. The reason for this is to bring watering tube 28 sufficiently close to the bottom of the cage to provide easy access for the animal within the cage. Watering tube 28 is secured to branch line 54 by means of an easy release valve connector 56 which will be described hereinafter. Valve connector 56 is in turn coupled with line 54 by threaded sleeve 58.

In use, distilled water or other liquid is fed under pressure into inlet pipe 22. A suitable reducing valve 60 and gage 62 are used to control the water pressure, which will normally be between 4 to 6 p.s.i. gage. The water then enters the main supply pipe 24. A suitable relief valve 64 is used for exhausting any air that may be in the system. The water flows from pipe 24 into all of the branch pipes 26 and then into watering tubes 28. Since the watering tubes are normally closed and can only be opened externally, the water can be maintained within them under pressure. Whenever an animal, such as experimental rodent 66 desires water, it is merely necessary for it to lick the bottom of the tube 28 thereby allowing a controlled amount of water to emanate from the tube. The manner in which the water flow is controlled will be explained hereinafter.

One embodiment of automatic watering tube 28 is illustrated in FIG. 11. Device 28 basically comprises an elongated tube 68 having a curved restricted portion 70 at one end. An opening 72 at the restricted end is surrounded by a ball socket 74 which socket is unitary with the restricted portion 70 and is formed therefrom. Socket 74 forms a spherical zone. Seated within socket 74 is a ball or sphere 76. The outer diameter of ball 76 is substantially the same as the inner diameter of socket 74, thereby insuring a close fit of the ball within the socket.

Secured within ball 76 is an elongated rod 78. Rod 78 projects vertically upward into central elongated opening 80 in seat 82. Seat 82 has a cylindrical outer surface and has a flat bottom 84. A cone 86 is cut downwardly in seat 82, with the apex of the cone being lowermost and positioned at the top of opening 80. Seat 82 is positioned upwardly from restricted end 70 and is maintained in this position by any of the means known in the art, such as the crimping of tube 68 above and below the seat.

A second ball or sphere 88 rests in conical portion 86 of seat 82 in the area adjacent opening 80. Conical portion 86 is provided with a spherical zone 90 adjacent opening 80 to insure the proper seating of second ball 88. It should be noted that second ball 88 rests freely in seat 82 and is unconnected to rod 78. A coiled compression spring 92 is telescoped over rod 78 and abuts the top of ball 78 at its lower end and bottom 84 of seat 82 at its upper end. Since spring 92 is a compression spring its normal tendency will be to force ball 76 into socket 74 thereby sealing hole 72.

In the embodiment of watering tube 28 shown, all of the parts are made of stainless steel with the exception of seat 82 which is made of Teflon (polytetrafluoroethylene). The reason for using these materials is that both of them can be autoclaved with complete safety. In view of the fact that cleanliness and sterility are essential with the use of experimental animals, any devices which come in contact with the animals must be adapted to be autoclaved or sterilized in a similar manner. Thus any other materials which will fulfill this function can also be used. If desired the Teflon seat can be replaced by a stainless steel seat.

As pointed out above watering tube 28 is connected in the pressure system by means of an easy release valve connector. A connector which has been found particularly useful with this invention is generally shown at 56 in FIGS. 5 and 6. Connector 56 includes a central tubular member 94. One end of tubular member 94 is externally threaded at 96. A connecting pipe 98 is threadedly secured on threaded end 96 and is mounted within sleeve 58 (FIG. 4). Adjacent threaded end 96 and spaced downwardly therefrom is an enlarged collar 100 which is integral with tube 94. Adjacent enlarged collar 100 is a smaller collar 102 which is also integral with tube 94.

The lower end of tube 94 is provided with a plurality of spaced openings 104 around its outer circumeference. These openings extend entirely through the wall of tube 94 and taper inwardly, with the smallest width of the opening being on the inner surface of the tube. Each opening 104 is filled with a freely movable ball 106. The diameter of the ball is smaller than the widest diameter of opening 104, but larger than the smallest diameter of opening 104, as seen in FIG. 5.

Slidably mounted on tube 104 is a tubular sleeve 108. Sleeve 108 is provided with an internal cylindrical recess 110 which projects inwardly from one end thereof. The diameter of recess 110 is slightly larger than the outer diameter of collar 102, whereby sleeve 108 may be telescoped over collar 102.

A coiled compression spring is telescoped over tube 94 and is maintained in recess 110. It is thus seen that coiled compression spring 112 abuts collar 102 and end wall 114 of recess 110.

A second cylindrical recess 116 is formed in the other end of sleeve 108. The purpose of this recess is to form part of a stop means to prevent the sleeve 108 from being forced off tube 94 by compression spring 112. Thus, it is seen in FIG. 5 that a retaining wire O-ring is mounted in one end of tube 94. Thus when the compression spring 112 is expanded the rear wall of recess 116 will abut the retaining O-ring 118.

The upper portion of tube 94 includes a spider 120, having a plurality of holes 122, mounted internally. A sleeve 124 which is integral with spider 120 projects upwardly from the center thereof. A rod 126 is slidably mounted in sleeve 124. A ball 128 is secured to the lower end of rod 126.

A plate 130 is mounted within tube 94 below spider 120. Plate 130 includes a central opening 132 having curved walls which form a socket for ball 128. A coiled compression spring 134 is telescoped over rod 126 and abuts ball 128 and the bottom of spider 120.

In use the water emanating from branch pipe 26 will enter the top of valve connector 56 through pipe 98. The water will proceed into valve 56 by passing through holes 122 in spider 120. However, the water will then be stopped by the combination of plate 130 and ball 128 (see FIG. 6).

As seen in FIGS. 5 and 6 the top of tube 68 of water tube 28 is adapted to cause the opening of valve 56. Thus it is seen that the outer diameter of tube 68 is slightly smaller than the inner diameter of tube 94. The top of tube 68 is provided with a thin U-shaped member 136 which includes vertical side walls 138 and bridging section 140 uppermost. Tube 68 also includes an integral concave groove 142 in its outer upper surface. Additionally, tube 68 includes an outwardly projecting shoulder 144 on its outer surface. Shoulder 144 is integral with the tube and includes an upper flat surface 146.

The method of coupling watering tube 28 with release valve 56 is illustrated in FIG. 6. Sleeve 108 is withdrawn rearwardly in the direction of arrows 148, thereby depressing spring 112. Collar 100 serves as a stop limit for sleeve 108. As seen in FIG. 6, the withdrawing of sleeve 108 will allow balls 106 to either drop out of holes 104 or be pushed out. The recess 116 is of a sufficiently large diameter to allow the balls 106 to be completely removed from the inner edge of holes 104, but of sufficiently small diameter to prevent the balls from being lost by passage completely out of holes 104 and through the recess. Tube 68 is then inserted into tube 94. In view of the fact that the outer diameter of sleeve 68 is substantially the same as the inner diameter of tube 94, tube 68 will automatically be centered within the outer tube. As insertion is continued, U-shaped member 136 will press against the bottom of ball 128 thereby causing it to rise (FIG. 5). Insertion of the tube 68 is continued until flat edge 146 of shoulder 144 abuts the bottom edge 150 of tube 94. Then the sleeve 108 is released and pushed forwardly by compression spring 112. The forward movement of sleeve 108 forces balls 106 back into holes 104 and causes the inner surfaces of the balls to project into tube 94. The use of collar 144 automatically aligns groove 142 adjacent holes 104. Therefore, the inner surfaces of the balls will be engaged in groove 142 thereby preventing the withdrawal of tube 68. Thus the tube 68 will be snapped securely in place and cannot be removed until sleeve 148 is slid backward to remove the pressure on balls 106.

With the tube 68 snapped securely in place in the position shown in FIG. 5 the water in release valve 56 will automatically enter watering tube 28. Thus it is seen in FIG. 5 that the water which was previously confined above plate 130 can now pass through plate 130 since closing ball 128 is now elevated out of hole 132. The water can freely pass under bridging section 140 of U-shaped member 136 and down into the central bore of tube 68. A sealing ring 152 on the inner surface of tube 94 prevents the leakage of any water past watering tube 28.

The aforementioned valve for snapping watring tube 28 in place has been found to be particularly effective when using the pressure watering system of this invention. As previously pointed out, in normal usage it is necessary to frequently sterilize any equipment that comes in contact with experimental animals. This is particularly true with watering tubes. When it is desired to remove the watering tube 28 for sterilization or other purposes, it is merely necessary to slide sleeve 108 upwardly in the direction of arrows 148. This releases the pressure on balls 106 and they can readily be pushed out of place by pulling watering tube 28 downwardly. As soon as the watering tube is pulled downwardly for removal spring 134 will automatically reseat ball 128 in the opening in plate 130 thereby resealing valve 56. Sleeve 124 and rod 126 maintain ball 128 in alignment with opening 132. In this manner, watering tubes can easily be inserted and withdrawn from a pressure system without the necessity of completely draining the system or otherwise closing it. Additionally it has been found that the insertion and release of the watering tube of this invention can be accomplished far more quickly than was possible with watering tubes previously used. It should also be noted that all parts of valve 56 can be of stainless steel thereby permitting them to be autoclaved for sterilization purposes.

It is a relatively simple matter for an animal to withdraw the water from the watering tube 28. As seen in FIG. 4 this is simply accomplished by the animal depressing ball 76 at the end of tube 68 with its tongue. Referring now to FIG. 11 it will be seen that the depression of ball 76 will in turn cause ball 88 to rise out of its seat thereby allowing water in to fill the lower portion of tube 68. This water in turn will move down tube 68 and out of opening 72 into the animal's mouth. When the animal has obtained a sufficient amount of water it will stop lapping the tube thereby automatically reseating the ball 76 in opening 72. This automatically terminates the flow of water. Upper ball 88 serves as a safety factor to insure the complete stoppage of the flow of water. It should be noted that whenever ball 76 is depressed rod 78 will keep ball 88 out of its socket thereby allowing the continual flow of water.

In most instances it will be totally unnecessary to use the upper ball 88 as a safety factor for stopping the supply of water. Thus the watering tube shown generally at 160 in FIG. 12 may be used. This tube is similar in most respects to tube 28 and includes a tubular body 162, a restricted opening 164, a socket 166 and a ball 168 within the socket. Rod 170 is secured to ball 168 and has a compression spring 172 telescoped over it. However, in this embodiment seat 82 is replaced by a spider 174 having a plurality of holes 176 formed therein. A sleeve 178 projects upwardly from spider 174. The purpose of the sleeve is to maintain rod 170 within the center of tube 162. Rod 170 is slidable within sleeve 178.

Watering tube 160 of FIG. 12 operates in the same manner as watering tube 28. Thus an animal will depress ball 168 whenever it desires water. The lower portion of tube 162 is always filled with water which enters through holes 176. Whenever an animal has obtained the desired amount of water it merely stops lapping the ball 168, thereby automatically closing tube 162.

Another embodiment of the automatic watering device of this invention is generally shown in FIG. 13 at 180. This embodiment also includes a tubular body 182, a restricted opening 184, a socket 186, and a ball 188. Projecting horizontally inward from tube 182 are a pair of aligned pins 190. These pins can be inserted through holes in the wall of tube 182 and subsequently welded in place. Slidably mounted on pins 190 is a leaf spring ball retainer generally shown at 192. As seen in FIG. 14 retainer 192 includes a pair of vertical sides 194, a substantially horizontal bottom 196, and angular sides 198 joining the bottom and vertical sides. Vertical sides 194 each have a hole 200 formed therein. The purpose of holes 200 is to mount the retainer on pins 190. The center of bottom 196 is provided with a spherical shaped dome 202 having a curvature similar to that of ball 188. Thus retainer 192 is a thin leaf spring which will resiliently hold ball 188 within socket 186. However, the tension of the spring is sufficiently small to allow for the easy depression by an animal's tongue. The operation of the watering tube of this embodiment is identical to that of the other embodiments.

The weight or tension on the spring used for each of the embodiments can vary depending upon the animals with which the device is intended to be used. The only prerequisite is that the weight be sufficiently small to allow for the ready depression of the spring by an animal's tongue but sufficiently large to insure that the ball will be securely reseated immediately upon the removal of the animal's tongue. It has been found that with most experimental rodents a spring weight about 0.016 pound on a 3/16-inch diameter ball is effective.

Although automatic watering tube 28 and its other embodiments have been described with reference to a complete pressure watering system, it is to be understood that the watering tube enjoys utility in any application where watering tubes of the prior art were used. Thus the watering tube may be inserted in a rubber stopper which is in turn inserted in a water bottle and subsequently placed on an animal cage. However, one aspect of this invention includes the use of the automatic watering tube in combination with a disposable bottle containing distilled water or other liquid. Thus in FIG. 7 there is shown a disposable bottle 210 and an automatic watering tube 28. Bottle 210 can be made of any of the well-known inexpensive disposable types of glass or plastic. The top of the bottle is threaded as at 212. After the bottle has been filled with distilled water a frangible seal 214 is placed over the top to retain the water therein. Any known water impervious frangible sealing material may be used such as saran film. A disposable cap can be placed on the bottle and covering the seal.

Although embodiment 28 is shown in this aspect of the invention it is to be understood that any of the embodiments of the watering tube may be used. The top of tube 68 is provided with a cap 216 having internal threads 218. Cap 216 has a flat bottom 220 with a central opening 222 in communication with the bore of tube 68. Mounted on bottom 220 and projecting angularly upward therefrom are a pair of piercing blades 224. Each blade includes a pointed tip 226 and a cutting edge 228 facing in the direction in which cap 216 will be rotated.

The use of the combination disposable bottle and automatic watering tube is shown in FIG. 10. Thus, it is seen that cap 216 is rotated in a clockwise direction to secure it to the top of bottle 210. During this rotation tip 226 will initially pierce film or seal 214 and the cutting edge 228 will cut the seal during the rotation of the cap. This in turn will allow the water within the bottle to fill watering tube 28. The bottle and tube can then be mounted on an animal cage in the conventional manner. When the water within the bottle has all been used up the bottle can either be thrown away or resterilized, filled, and sealed again. Likewise, the combination cap and disposable tube can be thrown away or resterilized. In this connection it should also be noted that cap 216 can be fabricated of stainless steel in order that it may be readily autoclaved. The watering tube and bottle of this aspect of the invention are particularly useful when dealing with highly contagious diseases or when used in locations away from hospitals and research centers where sterilization is not readily available.

Although the combination watering tube and quick release valve shown in FIGS. 5 and 6 have been described as being used in the complete system, it is to be understood that this combination can be tapped into any water supply line. The quick release valve 56 permits the ready removal of the watering tube for the purpose of sterilization.

Obviously many modifications and variations of the present invention are possible in the light of the above teachings. It is, therefore, to be understood that within the scope of the appended claims, the invention may be practiced otherwise than as specifically described.

What is claimed as the invention is:

1. An automatic watering device comprising a tube, said tube having a restricted opening on one end thereof, said restricted opening including a socket, means within said tube for conforming to and sealing said socket, a rod secured to said sealing means and projecting vertically upward therefrom, means for maintaining the vertical alignment for said rod, and means associated with said tube for automatically delivering water from a sealed source into the end of said tube opposite said one end, said delivering means being adapted to open the seal at said source.

2. The invention of claim 1 wherein the aligning means comprises a spider mounted in said tube having a sleeve projecting therefrom, with said rod being slidable in said sleeve.

3. The invention of claim 1 wherein the aligning means comprises a seat having a central opening passing therethrough, with said rod being slidable in said opening.

4. The invention of claim 3 wherein said seat additionally includes a conical recess in the top thereof, said recess terminating at said opening, a second socket being formed at the juncture of the opening and said recess, and means for conforming to and sealing said second socket.

5. The invention of claim 4 wherein said second socket comprises a spherical zone and said sealing means, therefore, comprises a sphere.

6. The invention of claim 1 wherein said resilient means comprises a coil compression spring telescoped over said rod and abutting said sealing means and said aligning means.

7. The invention of claim 1 and further including a quick release valve mounted on the end of said tube opposite said end having the restricted opening.

8. The invention of claim 7 wherein said quick release valve comprises a tubular member, means within said tubular member for sealing said tubular member, and means associated with said tubular member for securing said tube therein.

9. The invention of claim 8 wherein said tube includes an annular groove, and said tubular member has a plurality of circumferentially spaced holes formed therein, each hole having a ball therein which projects through said hole into said tubular member, said balls being releasably engaged within said grooves to secure said tubular member to said tube, and releasable means for maintaining said balls within said grooves.

10. The invention of claim 9 wherein said releasable means comprises a sleeve slidably mounted over said tubular member, said sleeve including a cylindrical recess on one end thereof, whereby said balls can be projected into said recess when said sleeve is moved longitudinally along said tubular member, thereby allowing the withdrawal of said tube from said tubular member.

11. The invention of claim 10 and further including spring means normally maintaining said sleeve over said balls thereby retaining said balls within said holes.

12. The invention of claim 8 wherein said means sealing said tubular member comprises a plate having a central opening, means sealing said central openings, and said tube including means for temporarily removing said sealing means from said central opening.

13. The invention of claim 12 wherein the walls of said central opening comprises a socket, the means sealing said central opening comprises a ball, and further including resilient means for maintaining said ball within said socket.

14. The invention of claim 1 and further including a cap on the end of said tube opposite said end having a restricted opening, said delivering means comprising at least one piercing and cutting means mounted within said cap.

15. The invention of claim 14 wherein said cap is internally threaded.

References Cited by the Examiner
UNITED STATES PATENTS

| | | | |
|---|---|---|---|
| 1,916,513 | 6/1933 | Jones | 222—446 |
| 2,311,207 | 2/1943 | Bussey | 119—18 |
| 2,434,167 | 1/1948 | Knoblauch | 251—149.6 |
| 2,510,252 | 6/1950 | Pine | 119—72.5 |
| 2,690,160 | 9/1954 | Kagan | 119—72.5 |
| 2,726,636 | 12/1955 | Frederiksen | 119—72.5 |
| 2,730,382 | 1/1956 | De Mastri | 251—149.6 |
| 2,946,308 | 7/1960 | Harris | 119—72.5 |
| 3,036,595 | 5/1962 | Rogers | 251—149.6 |

FOREIGN PATENTS 584,121   9/1959   Canada.

SAMUEL KOREN, *Primary Examiner.*

ALDRICH F. MEDBERY, *Examiner.*